(12) United States Patent
Chin

(10) Patent No.: US 6,819,830 B2
(45) Date of Patent: Nov. 16, 2004

(54) SYSTEM AND METHOD FOR COMMUNICATING DATA IN A NETWORK USING BACKCHANNEL SIGNALING

(75) Inventor: Hon Wah Chin, Palo Alto, CA (US)

(73) Assignee: Ciena Corporation, Linthium, MD (US)

( * ) Notice: Subject to any disclaimer, the term of this patent is extended or adjusted under 35 U.S.C. 154(b) by 103 days.

(21) Appl. No.: 10/099,181

(22) Filed: Mar. 12, 2002

(65) Prior Publication Data

US 2004/0208430 A1 Oct. 21, 2004

(51) Int. Cl.[7] .......................... G02B 6/28; H04B 10/08; H04B 17/00
(52) U.S. Cl. .............................. 385/24; 398/16; 398/20
(58) Field of Search ...................... 385/15, 24; 398/13, 398/14, 15, 16, 20, 21, 30–33, 162

(56) References Cited

U.S. PATENT DOCUMENTS

| | | | | |
|---|---|---|---|---|
| 4,973,169 A | * | 11/1990 | Slonecker | 398/79 |
| 4,994,675 A | * | 2/1991 | Levin et al. | 250/551 |
| 5,291,326 A | * | 3/1994 | Heidemann | 398/33 |
| 5,394,503 A | | 2/1995 | Dietz, Jr. et al. | |
| 5,570,217 A | * | 10/1996 | Fleuren | 398/13 |
| 5,666,453 A | | 9/1997 | Dannenmann | |

FOREIGN PATENT DOCUMENTS

| | | | | |
|---|---|---|---|---|
| JP | 05284110 A | * | 10/1993 | H04B/10/08 |
| WO | WO 9916194 A1 | * | 4/1999 | H04B/10/17 |

* cited by examiner

*Primary Examiner*—Hemang Sanghavi
*Assistant Examiner*—Scott Alan Knauss
(74) *Attorney, Agent, or Firm*—Michael R. Cammarata; Shailendra Bhumralkar; Chad R. Walsh

(57) ABSTRACT

The present invention provides a system and method for communicating data between network subsystems over optical fibers using a backchannel probe signal. In one embodiment, the present invention includes an optical network having an optical fiber coupled between first and second optical couplers residing in two different subsystems. A first processing unit is coupled to a first tap of the first optical coupler for providing an optical payload signal, and a second processing unit is coupled to a first tap of the second optical coupler for receiving the optical payload signal. A probe signal transmitter is coupled to a second tap of the second optical coupler for providing a probe signal, and a probe signal receiver coupled to a second tap of the first optical coupler for receiving the probe signal. The probe signal may be used to detect erroneous fiber connections or lossy inter-subsystem fibers.

20 Claims, 3 Drawing Sheets

SYSTEM AND METHOD FOR COMMUNICATING DATA IN A NETWORK USING BACKCHANNEL SIGNALING

BACKGROUND

The present invention relates to networks, and more particularly, to a system and method for communicating data in a network using backchannel signaling.

Recent years have seen an explosion in the demand for a variety of network applications and services. For example, as more and more users connect their personal computer systems to the internet, there is an ever increasing demand placed on the various networks that are used to support the evolving functionality of the internet. For another example, there is also an ever increasing demand placed on networks used in the telecommunications industry as the industry expands functionality to include carrying both voice and data across telecommunications networks.

Generally, networks typically comprise a number of data processing elements (i.e., network elements) connected together in a variety of configurations to allow communication of information (i.e., data) between the elements of the network and across different network groups. Exemplary network elements may include client computer systems, server computer systems, routers, bridges, telecommunication equipment, or optical communication equipment to name just a few. Network elements may be connected together in a network in a variety of configurations to receive, transmit, and/or process various types of information, such as voice information, video information, or generalized data, for example. Furthermore, network elements typically comprise both hardware and software subsystems (i.e., network element subsystems) such as, for example, power supply subsystems, signal processing subsystems (e.g., filters, amplifiers, multiplexers, optical-to-electrical converters, or electrical-to-optical converters), data processing subsystems (e.g., microprocessors, microcontrollers, or network processors), or software subsystems.

To meet the ever increasing demands for performance and functionality, network architectures, networks elements, and network element subsystems have grown in complexity. However, as the complexity of networks has increased, the burden of establishing proper connectivity and operability across the network has also increased. In particular, as both the number and interoperability of network element subsystems in a given network element has increased, establishing connectivity and operability of the network element subsystems has become more difficult. For example, an optical network element may include many subsystems that receive and/or transmit optical signals to other subsystems. There is often a concern about both the correct connection of these inter-system optical fibers.

Therefore, what is needed is a system and method for communicating information in a network about the connectivity of network element subsystems.

SUMMARY

The present invention provides a system and method for communicating data between network subsystems over optical fibers using a backchannel probe signal. In one embodiment, the present invention includes an optical network comprising an optical fiber coupled between first and second optical couplers, a first processing unit coupled to a first tap of the first optical coupler for providing an optical payload signal, a second processing unit coupled to a first tap of the second optical coupler for receiving the optical payload signal, a probe signal transmitter coupled to a second tap of the second optical coupler for providing a probe signal, and a probe signal receiver coupled to a second tap of the first optical coupler for receiving the probe signal.

In one embodiment, the probe signal may be used to detect erroneous fiber connections. In another embodiment, the probe signal may be used to detect erroneous inter-subsystem fiber losses.

In one embodiment, the optical fiber has a maximum data transfer capacity, and the optical payload signal utilizes a substantial majority of the data transfer capacity of the optical fiber channel, and the probe signal utilizes a substantial minority of the data transfer capacity of the optical fiber channel.

The following detailed description and accompanying drawings provide a better understanding of the nature and advantages of the present invention.

BRIEF DESCRIPTION OF THE DRAWINGS

FIG. 2A–D illustrate optical couplers according to embodiments of the present invention.

DETAILED DESCRIPTION

Embodiments of the present invention provide a system and method for communicating data in a network using a backchannel signal. As stated above, modern networks include complex networking equipment that may include a number of network elements each made up of a variety of subsystems. Embodiments of present invention allow network subsystems to communicate over inter-subsystem optical fibers using a backchannel probe signal. For example, in an optical network, optical data signals (i.e., payload signals) may be transmitted across an optical fiber from a first network subsystem to a second network subsystem. Each subsystem includes tap couplers, described in more detail below, for receiving each end of an inter-subsystem optical fiber. The tap couplers each include at least two taps. A first tap of the coupler in the first subsystem may be coupled to an optical output for sending payload signals. A first tap of the coupler in the second subsystem may be coupled to an optical input for receiving the payload signals from the first subsystem. A probe signal may be transmitted across the optical fiber in the opposite direction of the payload (i.e. a backchannel from the second subsystem to the first subsystem) by coupling the second tap of the coupler in the second subsystem to an optical transmitter, and coupling the second tap of the coupler in the first subsystem to an optical receiver. Accordingly, embodiments of the present invention may use a low bit rate backchannel probe signal to communicate information between subsystems with only a modest loss in payload signal power. For example, a backchannel probe signal can be transmitted with only minimal losses in the payload signal by selecting optical couplers that attenuate the payload signal by less than a total of 20% between subsystems.

Figure 1:
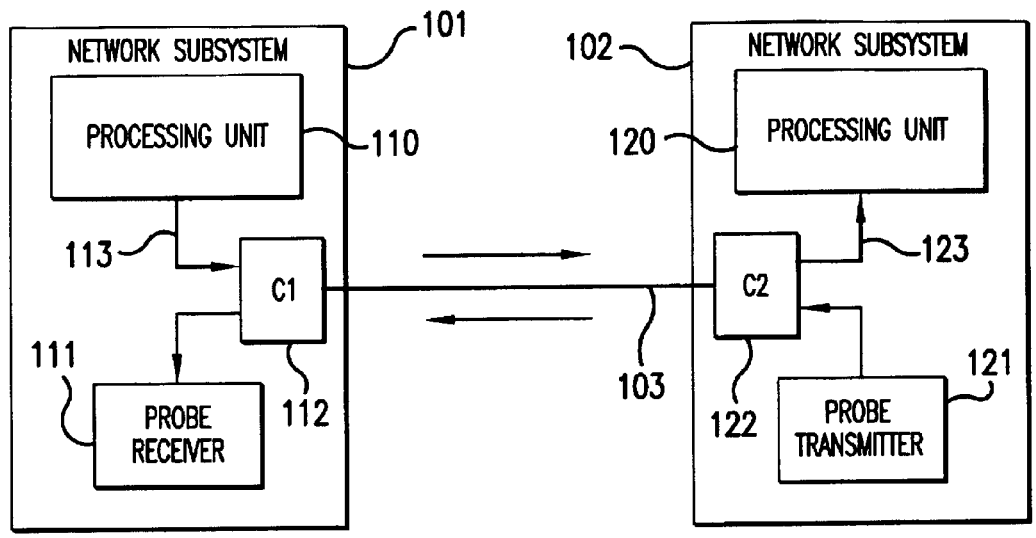
FIG. 1 illustrates a network subsystem configuration according to one embodiment of the present invention.

FIG. 1 illustrates a network subsystem configuration according to one embodiment of the present invention. Network subsystem 101 is coupled to network subsystem 102 by optical fiber 103. Network subsystem 101 includes a processing unit 110, probe receiver 111, and optical coupler 112 ("C1"). Processing unit 110 also includes an optical output 113 for providing optical data signals through optical coupler 112 and optical fiber 103 to network subsystem 102. Network subsystem 102 also includes a processing unit 120, probe transmitter 121 (i.e., probe generator), and optical coupler 122 ("C2"). Processing unit 120 includes an optical input 123 for receiving optical data signals from optical coupler 122.

Figure 2A:
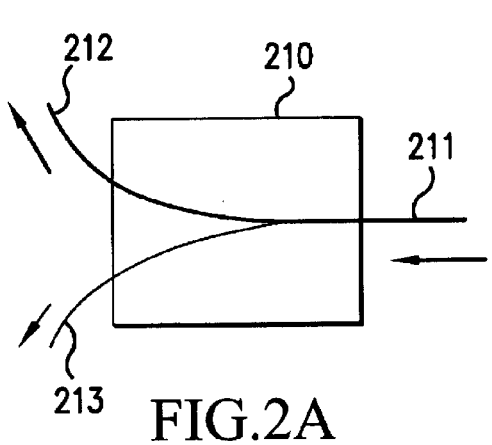
Figure 2B:
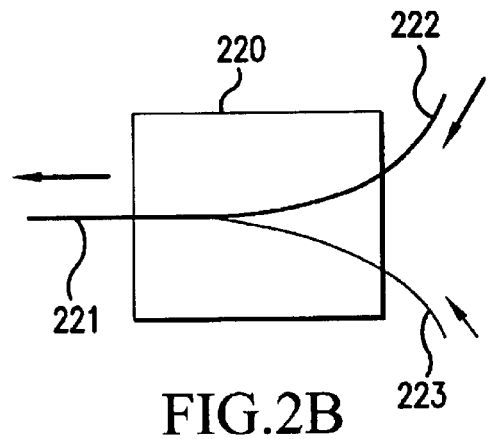

FIGS. 2A–B illustrate optical couplers utilized in embodiments of the present invention. Couplers can have different numbers of input and output ports (i.e., N×M). An N×M coupler may be either a bi-directional or directional device that receives N optical inputs and produces M optical outputs. FIG. 2A shows a coupler 210 receiving an optical signal on an terminal 211 and providing optical signals on taps 212 and 213. The optical power of the input signal is divided between the two taps according to the coupler's tap ratio. For example, if the coupler passes 1% of the input power to tap 213 and 99% of the input power to tap 212, then the tap ratio is 99:1. FIG. 2B shows a coupler 220 receiving optical signals on taps 222 and 223 and providing an optical signal on terminal 221. The optical power of each input signal is attenuated also in accordance with the tap ratio. For example, if the coupler passes 5% of the power received at tap 223 to terminal 221, and 95% of the power received at tap 222 to terminal 221, then the tap ratio is 95:5.

Figure 2C:
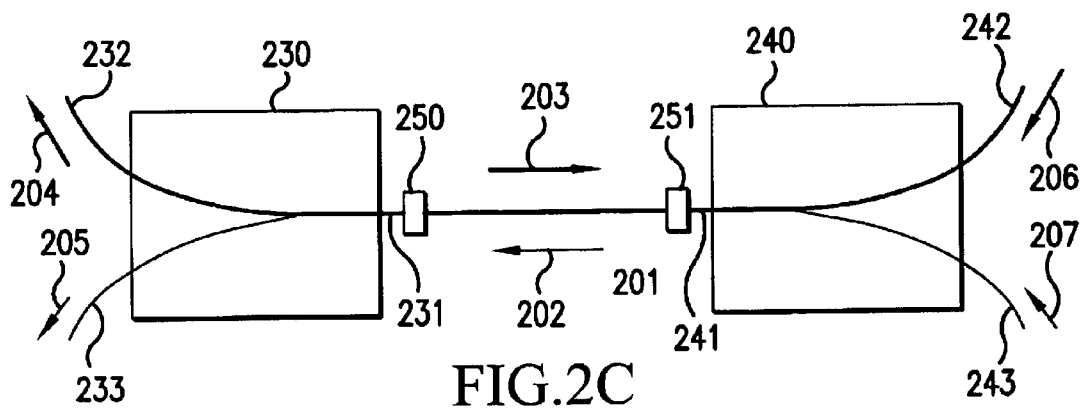

FIG. 2C illustrates an optical coupler configuration including a backchannel probe signal according to one embodiment of the present invention. Optical fiber 201 is coupled between optical couplers 230 and 240. Optical fiber 201 may be secured to each coupler using connectors 250 and 251. Coupler 230 receives an optical payload signal 204 on tap 232 and produces a payload signal 203 on fiber 201 through terminal 231 and connector 250. Coupler 240 receives the payload signal 203 from fiber 201 on terminal 241 and produces an input payload signal 206 on tap 242. Coupler 240 also receives a backchannel probe signal 207 on tap 243 and produces the backchannel probe signal 202 on fiber 201 through terminal 241 and connector 251. Coupler 230 receives the probe signal 202 from fiber 201 on terminal 231 and produces the probe signal 205 on tap 233.

Each coupler will have tap ratios that will impact the strength of the both the payload and probe signals. For instance, payload signal 204 will be attenuated between tap 232 and terminal 231 by an amount specified by the tap ratio of coupler 230. The payload signal will also be attenuated between terminal 241 and tap 242 by an amount specified by the tap ratio of coupler 240. Similarly, probe signal 207 will be attenuated between tap 243 and terminal 241 by an amount specified by the tap ratio of coupler 240. The probe signal will also be attenuated between terminal 231 and tap 233 by an amount specified by the tap ratio of coupler 230. It should be noted that a portion of payload signal 203 will also be received at tap 243, and a portion of probe signal 202 will be received at tap 232. Additionally, connectors 250 and 251 may cause small losses and reflections to both the payload and probe signals. These spurious signals are design parameters that will affect the performance of the system to varying degrees depending upon the particular implementation as will be well known to those skilled in the art in light of the present disclosure.

Referring again to FIG. 1, optical output 113 is coupled to a tap of coupler 112. Processing unit 120 is coupled to a tap of coupler 122 for receiving optical input 123. Probe transmitter 121 in subsystem 102 is coupled to a tap of coupler 122, and probe receiver 111 in subsystem 101 is coupled to a tap of coupler 112. Optical payload signals may be passed from processing unit 110 and received by processing unit 120 with a total attenuation (i.e., loss) determined by the tap ratios of the couplers. If couplers are chosen such that the total loss of the payload signal between processing unit 110 and processing unit 120 is less than 20%, then a backchannel probe signal may be passed between subsystem 102 and subsystem 101 for communicating connectivity and operability information with only a modest impact on the payload.

In one embodiment the couplers 112 and 122 have the same tap ratios. For example, processing unit 110 may be coupled to a 95% tap of coupler 112, and probe receiver 111 may be coupled to a 5% tap of coupler 112 (i.e., tap ratio=95:5). Similarly, processing unit 120 may also be coupled to a 95% tap of coupler 122, and probe transmitter 121 may be couple to a 5% tap of coupler 122. Therefore, a payload signal transmitted from subsystem 101 to subsystem 102 would experience a total system-to-system loss of $[1-(0.95)^2]=9.75\%$ (i.e., 5% loss for propagation through coupler 112 and 5% loss for propagation through coupler 122). The backchannel probe signal would experience a loss of $[1-(0.05)^2]=99.75\%$ (i.e., 95% loss for propagation through coupler 112 and 95% loss for propagation through coupler 122).

Of course, the present invention is not limited to particular values of the coupler tap ratios or particular wavelengths. Particular tap ratios may be selected according a variety of design parameters, such as the impact on the payload signal bit rate, crosstalk between the payload signal and the probe signal, spurious signal levels, sensitivity of the optical transmitters and receivers, probe signal bit rate, and tolerable system costs. In some embodiments, the probe signal power may be increased, thereby allowing for even smaller secondary taps for the backchannel probe signal. However, this will be limited by allowable system costs and tolerable levels of interference with the payload signal. Furthermore, in some embodiments, the probe signal wavelength and payload signal wavelength may be the same, while in other embodiments the wavelengths may be different from one another.

Coupler tap ratios may be varied in different applications to achieve different balances between the payload bit rates and probe signal bit rates. According to Shannon capacity theory, the maximum capacity, C, of a channel in bits per second (i.e., bit rate) is given by:

$$C = BW \log_2(1 + S/N),$$

where BW is bandwidth and S/N is the signal-to-noise ratio. Because signal power directly affects S/N, increasing the power will increase the bit rate, and decreasing the power will decrease the bit rate. Therefore, the bit rates of the payload and probe signals can be adjusted by altering the tap ratios of the couplers, which alters the power of each signal in the inter-subsystem fiber. As illustrated by the examples below, embodiments of the present invention utilize couplers with asymmetric taps so that the probe signal power is extremely low and the payload power is left substantially unaffected (e.g., about 20% maximum attenuation between subsystems). Because the payload power is substantially the unaffected by the probe signal, the payload utilizes a substantial majority of the data transfer capacity of the optical fiber channel, and the probe signal utilizes a substantial minority of the capacity of the optical fiber channel.

For example, if a 1% tap is used for each coupler in the probe signal path, and 99% taps are used for the payload signal (i.e., a ratio of 99:1 for each coupler), then the payload signal will only experience about 2% loss, and the backchannel probe signal will experience approximately 99% loss. Therefore, for a 2 mW probe signal (i.e., 3 dBm) transmitted from probe transmitter 121, the probe signal power will be 2 e–2 mW on fiber 103 after attenuation by coupler 122 (i.e., 1% or $10^{-2}$), and 2 e–4 mW (i.e., –37 dBm) at the input to probe receiver 111. Therefore, the probe signal receiver should have a sensitivity sufficient to receive the attenuated probe signal. On the other hand, if a 4 mW payload signal (6 dBm) is provided as an optical output signal 113, then processing unit 120 will receive an optical input of 3.92 mW (i.e., 4 mW*$(0.99)^2$). Thus, a backchannel probe signal has been established between systems with a loss of only about 2% of the payload's signal power.

Actual implementations may include connector reflections as high as –45 dB or higher (i.e., payload reflections at connector 250 back into terminal 231). Therefore, either the strength of optical payload signal 113, or the tap ratio of the couplers, should be selected such that spurious reflections are sufficiently below the probe receiver sensitivity to allow accurate reception of the probe signal. For the 4 mW example above (i.e., a 6 dBm output signal), a connector producing reflections –45 dB down from the incident waves will produce a –39 dBm signal back into the coupler (i.e., 6 dBm–45 dB). Since the coupler has a tap ratio of 99:1, the signal received at the input to the probe receiver is only –59 dBm (i.e., $10^{-2}$=–20 dB and –39 dBm –20 dB=–59 dBm). Thus, for this example, reflections caused by the connector are well below the probe signal level (–37 dBm) at the input of the probe receiver.

In another embodiment, the sensitivity of the probe receiver 111 can be relaxed by using larger secondary taps for the probe signal. For example, if a 2% tap is used for each coupler in the probe signal path, and 98% taps are used for each coupler in the payload signal path, then the strength of the probe signal at the input of the probe receiver will be larger. However, the increased probe signal strength leads to a corresponding reduction in the payload signal strength. This results in a larger bit rate for the probe signal at the expense of reducing the bit rate for the payload. This may also result in increased crosstalk between the payload and probe signals, as well as increasing the spurious probe signal reflections received at the input of processing unit 120.

Figure 3:
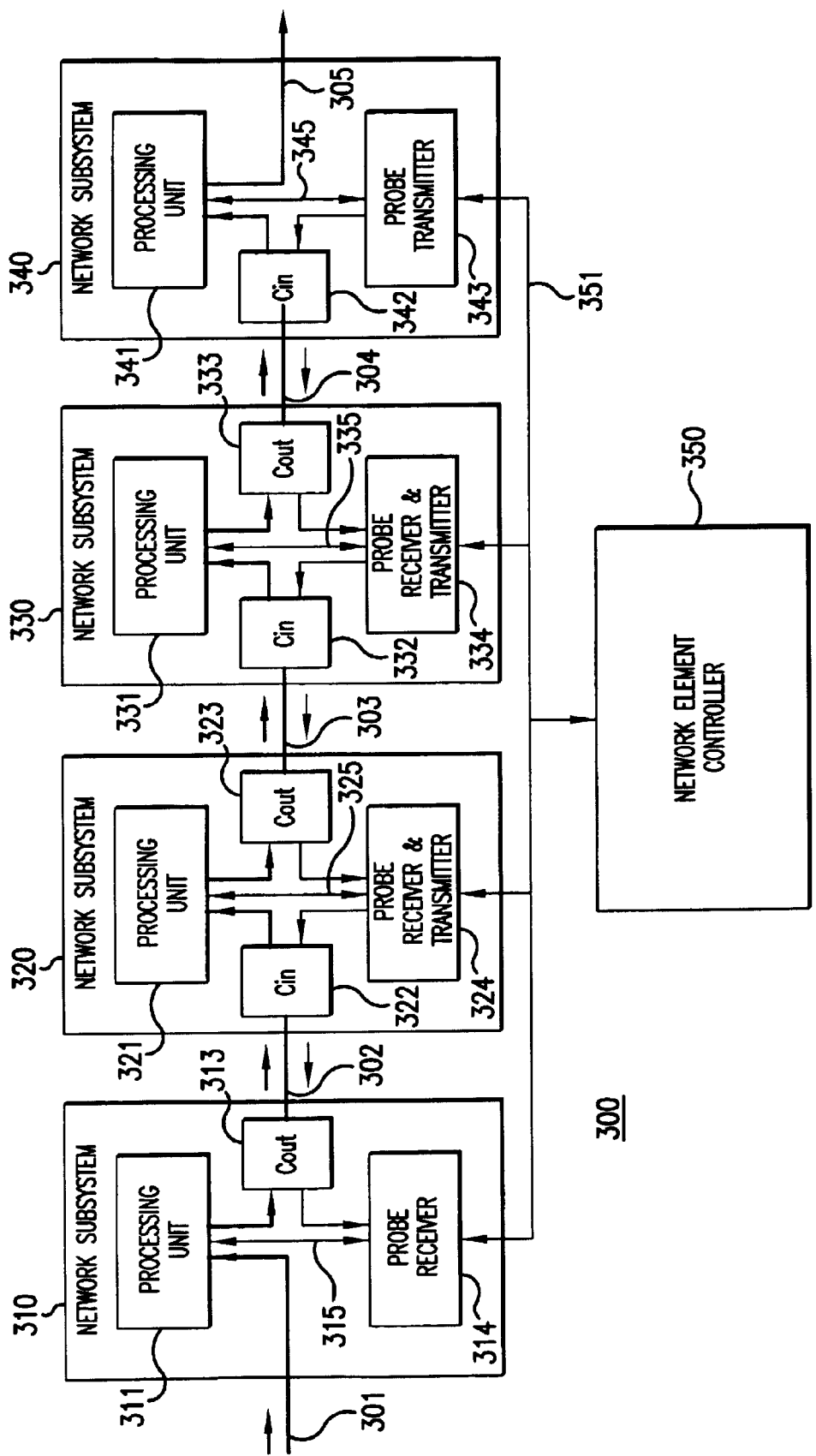
FIG. 3 illustrates a network element utilizing backchannel signaling to communicate data according to one embodiment of the present invention.

FIG. 3 shows an illustrative network element 300 utilizing backchannel signaling to communicate data according to one embodiment of the present invention. Network element 300 includes exemplary network subsystems 310, 320, 330, and 340. Each subsystem includes a processing unit 311, 321, 331, and 341 for carrying out the particular functionality of the subsystem. For example, each network element subsystem may include an optical signal processing unit for implementing optical signal processing functions such as amplification, filtering, switching, wavelength conversion, multiplexing, demultiplexing, power monitoring, or other optical processes. Additionally, the processing units may perform optical-to-electronic conversions, electronic-to-optical conversions, or both, and may further include electronic data processing of the information stored in the optical payload signals.

A network element may first receive an optical payload signal in network subsystem 310 on optical fiber 301. The payload signal on optical fiber 301 may be received from another remote network element, for example. Processing of the optical payload signals in a network element may require a variety of both optical and electronic operations. Each subsystem may perform one or more of the operations using processing units 311, 321, 331, and 341. Intermediate optical payload signals may be passed between subsystems on optical fibers 302, 303, and 304. The network element may also transmit an optical payload output signal to another network element on outgoing optical fiber 305.

In one embodiment, the present invention is used to determine whether or not each of the inter-subsystem optical fibers 302, 303, and 304 are connected between the correct subsystems. While only three inter-subsystem fibers are shown, it is to be understood that network elements may include fewer or many more such fibers. Accordingly, the present embodiment is illustrative only. A probe signal backchannel is established between each subsystem by including couplers at each end of the of inter-subsystem fibers. For example, a probe signal may be sent from probe transmitter 324 in subsystem 320 to probe receiver 314 in subsystem 310 through couplers 322 and 313 over optical fiber 302. Additionally, a probe signal may be sent from probe transmitter 334 in subsystem 330 to probe receiver 324 in subsystem 320 through couplers 332 and 323 over optical fiber 303. Furthermore, a probe signal may be sent from probe transmitter 343 in subsystem 340 to probe receiver 334 in subsystem 330 through couplers 342 and 333 over optical fiber 304.

Each network subsystem may be coupled to a network element controller 350 over a bus 351. In one embodiment, network element controller 350 controls the transmission of probe signals in each subsystem, and monitors the reception of each probe signal to determine whether or not the inter-subsystem fibers are connected between the proper subsystems. This may be achieved by monitoring whether or not the transmitted probe signals are received in the expected subsystems. If controller 350 signals probe transmitter 324 to transmit a probe signal to subsystem 310, then controller 350 will monitor probe receiver 314 to determine if a probe signal is received. If no probe signal is received, then fiber 302 may be connected between the wrong subsystems. Controller 350 may poll the other subsystem probe receivers to determine which subsystem received the transmitted probe signal. Alternatively, controller 350 may sequentially signal each of the other subsystems to transmit a probe signal until probe receiver 314 receives a probe signal. When receiver 314 receives a probe signal, controller 350 can determine which subsystem is connected to subsystem 310. Additionally, when an erroneous connection is detected, controller 350 may generate an error signal, and send the error signal to a user indicating that there is a connection error. Furthermore, a user can be provided with information about which inter-subsystem connections are incorrect. A user can then be guided through steps for establishing the correct connections. Because the probe signal does not interfere with the payload signals, connections can be verified either during a setup procedure or while the system in service.

Embodiments of the present invention may also be used for a simultaneous determination of power loss between subsystems in a network element. In many optical network configurations, optical signals may be passed through more than one optical process without the benefit of signal reconditioning (e.g., amplification or other signal gain). When an optical signal is processed by multiple processors without reconditioning, the optical signal may begin to deteriorate. In such a situation, losses can be critical to system performance, and a lossy fiber connection may result in a system malfunction. Optical processing units that do not recondition the signal between the input and output are referred to herein as passive optical processing units. Examples of passive optical processes are multiplexing, demultiplexing, optical switching, or passive optical filtering to name just a few. Erroneous losses between such systems may be caused by bent fiber cables, dirty connections, or crimped fibers, for example. In addition to detecting connectivity errors, the present invention may simultaneously measure the loss between subsystems due to fiber connections by comparing the transmitted power of the backchannel probe signal in a first subsystem to the received power of the probe signal in a second subsystem. Accordingly, inter-subsystem fibers experiencing erroneous losses can be quickly detected and repaired.

For example, if processing units 311,321, 331, and 341 perform optical processes on an input signal without reconditioning, then losses caused by inter-subsystem fibers 302, 303, and 304 may be essential to proper system performance. However, according to embodiments of the present invention, the power transmitted by probe transmitter 324 is compared to the power received by probe receiver 314 to detect erroneous losses in fiber 302. Additionally, the power transmitted by probe transmitter 334 is compared to the power received by probe receiver 324 to detect erroneous losses in fiber 303. Finally, the power transmitted by probe transmitter 343 is compared to the power received by probe receiver 334 to detect erroneous losses in fiber 304. Network element controller 350 may compile the power data from each probe unit (i.e., from each probe receiver and/or transmitter) and compare the transmitted and received probe powers to expected values in order to detect erroneous losses. Accordingly, when the probe signal power received is less than an expected value, controller 350 may generate an error signal or fault information. Expected values will based on the particular system configuration, and can be determined either theoretically or by calibration. Controller 350 may then present the error signal or fault information to other system software for presentation to a user.

Figure 4:
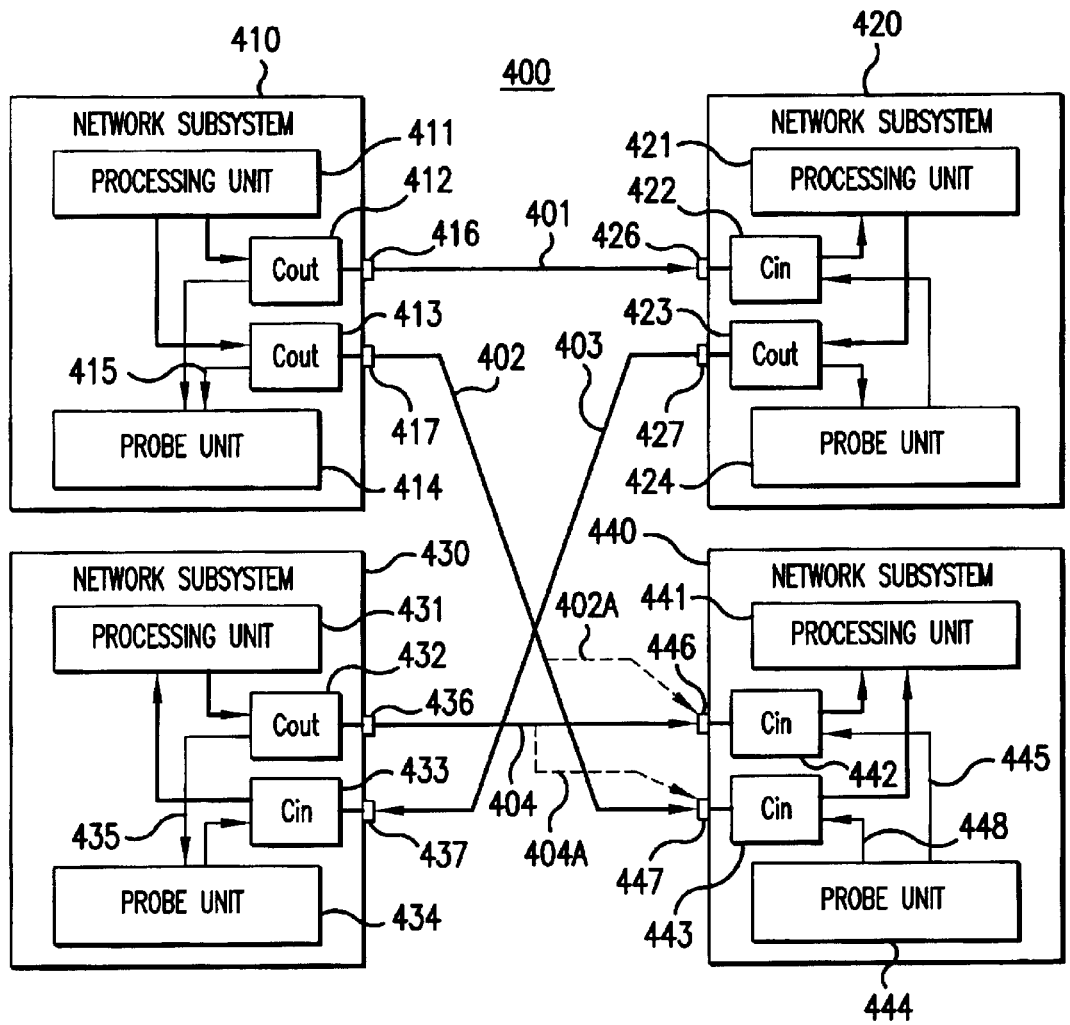
FIG. 4 shows another example of network subsystem connections to further illustrate features and advantages of the present invention.

FIG. 4 shows another example of network subsystem connections to further illustrate features and advantages of the present invention. Network subsystems 410, 420, 430, and 440 each include two fiber connections to two other subsystems. When properly connected, subsystem 410 provides payload signals to subsystems 420 and 440 through payload output ports 416 and 417. Subsystem 420 receives a payload signal from subsystem 410 through payload input port 426, and provides a payload signal to subsystem 430 through payload output port 427. Additionally, subsystem 430 receives a payload signal from subsystem 420 through payload input port 437, and provides a payload signal to subsystem 440 through payload output port 436. Finally, subsystem 440 receives payload signals from subsystem 410 and 430 through payload input ports 446 and 447, respectively. However, dashed fibers 402A and 404A illustrate an instance where the payload fiber inputs to subsystem 440 are incorrectly connected to the wrong ports (i.e., the fiber connections are accidentally switched). Probe units in each subsystem, in conjunction with a network controller (not shown), may be used to detect and correct improper subsystem connections. Even though the crossed fibers shown in FIG. 4 illustrate the case of crossed inputs, it should be understood that the present invention also applies to crossed outputs or other combinations of incorrectly connected inputs and outputs.

Each subsystem includes a processing unit 411, 421, 431, and 441 for performing an optical processing function. Subsystem 410 includes couplers 412 and 413 that receive optical output signals from processing unit 411. Coupler 412 is connected to fiber 401, which is also connected to coupler 422 in subsystem 420 for providing a payload signal to processing unit 421. Subsystem 410 also provides a payload signal to subsystem 440. Coupler 413 is connected to fiber 402, which is incorrectly connected (402A) to coupler 442 in subsystem 440. Similarly, subsystem 430 includes couplers 432 and 433. Processing unit 430 receives an optical input signal from subsystem 420 via couplers 423 and 433 and fiber 403. Processing unit 430 provides an output payload signal to coupler 432. Coupler 432 is connected to fiber 404, which is incorrectly connected (404A) to coupler 443 in subsystem 440.

Incorrect connections can be detected by probe signals controlled by probe units in each subsystem. For example, subsystem 410 includes probe unit 414 for receiving probe signals from subsystems 420 and 440. Additionally, subsystem 420 includes probe unit 424 for receiving a probe signal from subsystem 430 and for transmitting a probe signal to subsystem 410. Furthermore, subsystem 430 includes probe unit 434 for receiving a probe signal from subsystem 440 and for transmitting a probe signal to subsystem 420. Finally, subsystem 440 includes probe unit 444 for transmitting probe signals to subsystems 410 and 430. Cross-connected fibers 402A and 404A can be detected by transmitting independent probe signals on lines 445 and 448. If subsystem 410 receives a probe signal when line 445 is activated, or if subsystem 430 receives a probe signal when line 448 is active, then a incorrect connection can be detected.

Probe signals according to embodiments of the present invention may include either a single optical backchannel pulse or serial data streams carried by the optical backchannel signal. In one embodiment, an optical probe transmitter may simply provide an active output for a predetermined time period. The reception of a probe signal in a probe receiver may be used to generate another signal indicating that a probe signal was received. Additionally, the power of the received probe signal may also be determined and provided to other parts of the system for detecting erroneous losses, as mentioned above. According to other embodiments, the probe signal may include serial data carrying information about the transmitting subsystem, such as an identification code. The identification code value may correspond to a particular subsystem. Additionally, the identification code may also indicate a specific subsystem port. Port identification may be useful in establishing proper connectivity between two subsystems that have many inter-subsystem fiber connections.

Thus, the present invention provides a system and method for communicating data in a network using backchannel signaling. While the system and method have been described with reference to particular embodiments, it will be apparent to those of ordinary skill in the art that modifications to the above embodiments can be made without departing from the scope of the invention as defined by the claims. Accordingly, the embodiments disclosed are intended to be illustrative, but not limiting, of the scope of the invention, which is set forth in the following claims.

What is claimed is:

1. An optical network comprising:
   an optical fiber coupled between first and second optical couplers;
   a first processing unit coupled to a first tap of the first optical coupler for providing an optical payload signal;
   a second processing unit coupled to a first tap of the second optical coupler for receiving the optical payload signal;

a probe signal transmitter coupled to a second tap of the second optical coupler for providing a probe signal; and a probe signal receiver coupled to a second tap of the first optical coupler for receiving the probe signal where a tap ratio based on percentage of power usage between the first tap of the first optical coupler and the second tap of the first optical coupler is selected from the group consisting of 95 to 5, 98 to 2, and 99 to 1.

2. The optical network of claim 1 wherein the optical fiber has a maximum data transfer capacity, and the optical payload signal utilizes a substantial majority of the data transfer capacity of the optical fiber channel, and the probe signal utilizes a substantial minority of the data transfer capacity of the optical fiber channel.

3. The optical network of claim 2 wherein the total attenuation of the optical payload signal between the first processing unit and the second processing unit is less than 20%.

4. The optical network of claim 1 wherein the probe signal is a single optical pulse.

5. The optical network of claim 1 wherein the probe signal comprises serial data.

6. The optical network of claim 5 wherein the serial data includes an identification code.

7. The optical network of claim 1 further comprising a controller coupled to the probe signal transmitter and the probe signal receiver.

8. The optical network of claim 7 wherein the controller signals the probe signal transmitter to send a probe signal, and the controller monitors the probe signal receiver to detect reception of a probe signal.

9. The optical network of claim 8 wherein when a probe signal is transmitted by the probe signal transmitter but not received by the probe signal receiver, the controller generates an error signal.

10. The optical network of claim 7 wherein the controller compares the probe signal power transmitted by the probe signal transmitter to the probe signal power received by the probe signal receiver.

11. The optical network of claim 10 wherein when the probe signal power received is less than an expected value, the controller generates an error signal.

12. A method of transmitting data in an optical network comprising:

transmitting an optical data signal across an optical fiber in a first direction from a first network subsystem to a second network subsystem;

transmitting a probe signal across the optical fiber in a second direction from the second network subsystem to the first network subsystem;

comparing the probe signal power transmitted to the probe signal power received;

wherein a power loss of the probe signal is measured between the second network subsystem and the first network subsystem by comparing the power of the transmitted probe signal from the second network subsystem to the power of the probe signal received in the first network subsystem; and generating an error based on the power loss of the probe signal determined by said comparing.

13. The method of claim 12 wherein the optical data signal utilizes a substantial majority of the data transfer capacity of the optical fiber channel, and the probe signal utilizes a substantial minority of the data transfer capacity of the optical fiber channel.

14. The method of claim 12 further comprising generating an error signal when the probe signal is transmitted by the second network subsystem but not received by first network subsystem.

15. The method of claim 12 wherein the probe signal is a single optical pulse.

16. The method of claim 12 wherein the probe signal comprises serial data.

17. An optical network comprising:

means for transmitting an optical data signal across an optical fiber in a first direction from a first network subsystem to a second network subsystem;

means for transmitting a probe signal across the optical fiber in a second direction from the second network subsystem to the first network subsystem;

means for measuring a power loss of the probe signal between the second network subsystem and the first network subsystem by comparing the power of the transmitted probe signal from the second network subsystem to the power of the probe signal received in the first network subsystem; and means for generating an error signal according to the power loss of the probe signal measured be said measuring means.

18. The optical network of claim 17 further comprising:

means for coupling a first percentage of the optical data signal from the first network subsystem to a fiber, and for coupling a second percentage of the probe signal from the fiber to a probe receiver; and means for coupling a third percentage of the optical data signal from the fiber to the second network subsystem, and for coupling a fourth percentage of the probe signal from a probe transmitter to the fiber.

19. The optical network of claim 17 further comprising means for generating an error signal when the probe signal is transmitted by the second network subsystem but not received by the first network subsystem.

20. The method of claim 16, wherein the serial data of the probe signal carries identification of the first network subsystem or a part of the first network subsystem.

* * * * *